F. SCHUBERT.
POCKET PRESSURE TEST GAGE.
APPLICATION FILED SEPT. 29, 1910.

994,877.

Patented June 13, 1911.

WITNESSES:
Edgar M. Greenbaum
Charles V. Dwyer

INVENTOR
Frederick Schubert,
BY
E. F. Gemmert
ATTORNEY

UNITED STATES PATENT OFFICE.

FREDERICK SCHUBERT, OF SELLERSVILLE, PENNSYLVANIA.

POCKET PRESSURE TEST-GAGE.

994,877.

Specification of Letters Patent. Patented June 13, 1911.

Application filed September 29, 1910. Serial No. 584,459.

*To all whom it may concern:*

Be it known that I, FREDERICK SCHUBERT, a citizen of the United States, and resident of Sellersville, in the county of Bucks and State of Pennsylvania, have invented certain new and useful Improvements in Pocket Pressure Test-Gages, of which the following is a specification.

This invention relates to pocket pressure test gages for pneumatic tires and other purposes, and has for its object to produce a gage in a manner as hereinafter set forth, whereby a small convenient device is produced for quickly ascertaining the maximum pressure of a pneumatic tire and the like, without loss of air and without the possibility of getting a false reading.

A further object of the device is to automatically return the index hand to zero by means of a weight after the indicated pressure has been noted.

With the foregoing and other objects in view, the invention consists of the novel construction, combination and arrangement of parts as hereinafter more specifically described and illustrated in the accompanying drawings wherein is shown the preferred embodiment of the invention, but it is to be understood that changes, variations and modifications can be resorted to which come within the scope of the claims hereunto appended.

Figure 1:
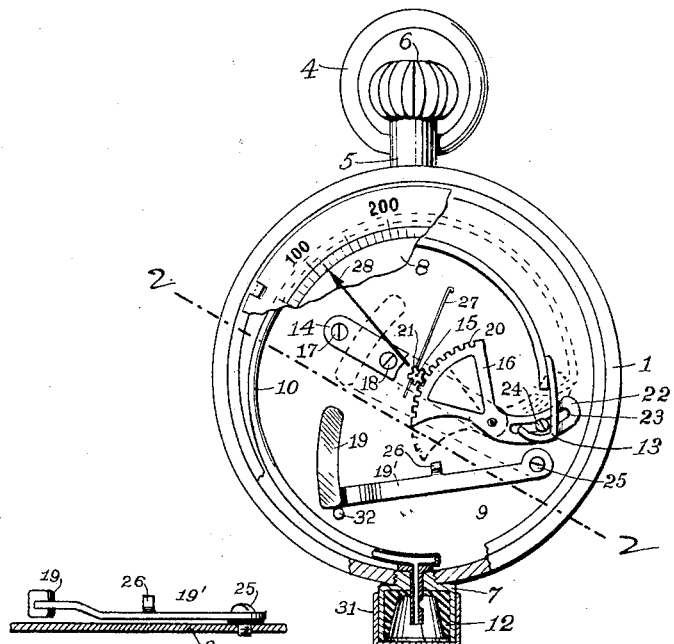
Figure 2:
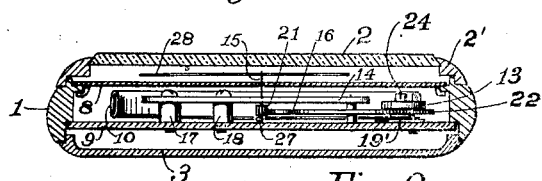
Figure 6:
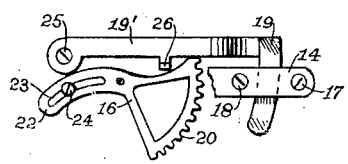
Figure 3:
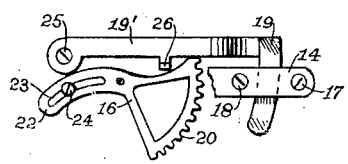
Figure 4:
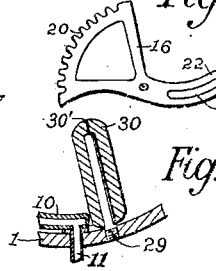
Figure 5:
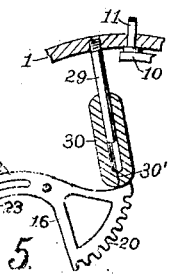

In the drawings, wherein like reference characters denote corresponding parts in the several views: Figure 1 is a front elevation, the glass and rim being removed, the dial broken away in part, and the frame for the movement being shown in part by dotted lines for clearness of illustration: the socket is shown in center section. Fig. 2, is a cross sectional view on dot and dash line 2—2 of Fig. 1. Fig. 3 shows part of the movement in an inverted position when the weight returns the sector and hand to zero. Fig. 4 is part of the movement and a modified weight, in a normal position. Fig. 5 is an inverted view of Fig. 4 showing the position of the weight when the sector and hand is returned to zero, and Fig. 6 is an edge view of the weighted lever shown in Figs. 1 and 3.

For convenience in carrying, the gage is inclosed in a case, 1, similar in size and appearance to the electrical pocket meters used by electricians to quickly meter the voltage or amperage of an electric current, the complete case comprising the glass cover, 2, glass rim 2', back cover, 3, ring, 4, ring stud, 5, and knob, 6. The ring 4 is pivoted in the stud as usual, and the knob and stud may be of one piece, for the reason that it is only used to press the case down upon a tire nipple, as the socket, 7, is diametrically opposite to the knob. The dial, 8, is held in position in any preferred manner. The movement proper may be completely mounted on a base plate, 9. A Bourdon-tube spring, 10, is fastened to the lower part of the case, where it communicates with a hollow pin, 11, being centrally situated within the socket, 7, which socket is provided with a soft rubber lining, 12, slightly tapered, to adapt it to slip over any standard tire nipple—not shown. The free end of the Bourdon-tube spring is capped, a hook, 13, being preferably soldered at or near the end as shown.

The movement consists of a bearing frame, 14, in which the pinion shaft, 15, and the balanced sector, 16, are journaled; this frame is preferably mounted on two posts, 17, 18, whereby a space is provided to permit the weight 19, which is fastened to an oscillating lever, 19' to enter between them, as is shown by dotted lines in Fig. 1. The sector has teeth, 20, on the periphery of the arc, as usual, which engage a pinion, 21. The free end of the sector, 22, is curved, and has a slot, 23, in which a stud, 24, is adjustably mounted; this stud is engaged by the hook, 13, and is carried forward only in one direction when pressure within the Bourdon-tube spring acts on it, the increased diameter being shown by dotted circles, and the position of the sector being likewise shown by dotted lines in Fig. 1. The weighted lever, 19', is also mounted on the base plate by a rivet or screw, 25, as above described; at a proper point a finger, 26, is bent upward so as to engage the side of the sector. A pin, 32, limits downward movement of the lever. A friction spring, 27, may be used to press against the pinion shaft, the pointer or indicator, 28, being mounted on said shaft: the pointer is broken away for clearness of illustration in Fig. 1. A cap, 31, may be used on the socket to prevent dust from entering the gage, when carried in the pocket, or elsewhere.

A modification is shown in Figs. 4 and 5 and refers only to the weight, the other part of the movement being identically as described. In the modification a post, 29, is placed in the lower part of the case, upon which post a weight, 30, slides: this weight is preferably cylindrical in shape and is provided with a fine hole, 30', to break any vacuum therein, and to cause weight to act quickly and without any check. This weight strikes the sector, as shown in Fig. 5, to return the indicator and movement to zero. Fig. 4 shows the weight in a normal position, to permit free movement of sector when taking a reading of the pressure.

Such being the construction, the operation is as follows:—To ascertain the pressure within a pneumatic tire, the gage is pressed down tightly over the nipple, the pin, 11, opening the valve and letting the air enter up through the pin into the Bourdon-tube spring, which distends according to the pressure, friction of the spring 27, against the pinion shaft, 28, tending to hold the pointer at the maximum point. The gage is removed and the pressure indicated by the pointer and dial, is noted. If the testing is done in a dark place, as is quite usual, the gage can be taken to the light and the reading noted, it being only required that the gage be handled in a vertical position, same as when the testing was done. In testing the hook pulls the sector only in one direction under pressure; as soon as the pressure is released the Bourdon-tube spring and hook return to their normal position, leaving the indicator and movement however in exactly the same position as when under pressure, spring 27 aiding friction in holding the indicator at the registering point. To reset the pointer and movement to zero, invert the gage, when the weight will press against the sector, and overcoming the friction of the spring, 27, will set the movement back to zero.

What I claim is:

1. In a pressure gage, a case provided with a socket at its lower end, said socket being lined with a flexible material, a hollow pin in said socket, a Bourdon-tube spring fastened to said case, said Bourdon-tube spring having a communication with said pin and socket, a hook on the free end of said Bourdon-tube spring adapted to engage a stud mounted on the free end of a sector, said sector, a pinion mounted upon a pinion shaft and engaging said sector, an indicator surmounting said pinion shaft, a dial upon which the indicator shows the pressure and means for setting said sector and indicator to zero, said means comprising a weight acting on said sector only when the gage is inverted.

2. In a pocket pressure gage for pneumatic tires, a case provided with a socket on its periphery, said socket being adapted to make an air tight joint on a tire nipple, a Bourdon-tube spring fastened in said case, a hollow pin centrally placed in said socket, means for effecting an operative connection between said pin and said spring, a movement comprising a sector, a pinion and pinion shaft mounted in a frame within said case, said pinion engaging said sector, a pointer mounted on said pinion shaft, a dial upon which the pointer indicates the pressure, a means on the free end of said Bourdon-tube spring for engaging the free end of said sector, and operative in one direction only, when pressure is applied in said Bourdon-tube spring, and means for setting said sector to zero, said means comprising a weight acting on said sector only when the gage is inverted.

3. In a pocket pressure gage for pneumatic tires, a case provided on the lower periphery with a socket adapted to simultaneously open a tire valve and make an airtight joint between said case and a tire nipple, a Bourdon-tube spring fastened in said case and having a communication with said socket, a movement mounted in said case, said movement comprising a frame, a sector, a pinion mounted on a pinion shaft and engaging said sector, an indicator mounted on said pinion shaft, a dial upon which the indicator shows the pressure, means on the free end of said Bourdon-tube spring for engaging the free end of said sector only when pressure is applied to said Bourdon-tube spring, and a weighted lever adapted to operate said sector only when the gage is inverted.

4. In a pocket pressure gage for pneumatic tires, a case provided with means for connecting with a pneumatic tire, a movement in said case comprising a Bourdon-tube spring, having a communication with said connecting means, a movement mounted in said case comprising a sector, a pinion, mounted on a pinion shaft surmounted by a pointer, said pinion engaging said sector, a dial upon which the pointer indicates the pressure, a means on the free end of said Bourdon-tube spring for operating said sector in one direction only, and a weighted means for operating said sector in one direction only when the gage is inverted.

Signed at Sellersville in the county of Bucks and State of Pennsylvania this 27th day of September A. D. 1910.

FREDERICK SCHUBERT.

Witnesses:
RICHARD WERCHAN,
ROBERT THOMAS.